TELEVISION SYSTEM

Filed Aug. 28, 1958

3 Sheets-Sheet 1

INVENTOR.
JARRETT L. HATHAWAY
BY
Charles H. Brown
ATTORNEY

May 2, 1961 J. L. HATHAWAY 2,982,813

TELEVISION SYSTEM

Filed Aug. 28, 1958 3 Sheets-Sheet 2

INVENTOR.
JARRETT L. HATHAWAY
BY
Charles H. Brown
ATTORNEY

May 2, 1961 J. L. HATHAWAY 2,982,813

TELEVISION SYSTEM

Filed Aug. 28, 1958 3 Sheets-Sheet 3

INVENTOR.
JARRETT L. HATHAWAY
BY
Charles H. Brown
ATTORNEY

United States Patent Office 2,982,813

Patented May 2, 1961

2,982,813

TELEVISION SYSTEM

Jarrett L. Hathaway, Manhasset, N.Y., assignor to Radio Corporation of America, a corporation of Delaware Filed Aug. 28, 1958, Ser. No. 757,862

5 Claims. (Cl. 178—5.6)

This invention relates to a television transmission system in which the sound and picture components of a television signal are transmitted over a single circuit.

It is an object of the invention to provide an improved system for simultaneously transmitting the picture and sound signals in a television signal over a single video circuit.

A further object is to provide a novel television transmission system in which the sound signal or component is interleaved at a pre-selected position in the frequency spectrum of the picture signal by positioning the sound signal in the space between a selected pair of energy bunches of the picture signal, permitting the simultaneous transmission of the sound and picture signals over a single video circuit.

The useful energy of broadcasting television signals occupies the spectrum from 30 c.p.s. (cycles per second) through about 4.2 mc. (megacycles). The picture content changes the distribution of energy within the band but certain conditions always exist. Video generated by scanning a picture is composed mainly of energy which is harmonically related to the horizontal and vertical scanning rates. Thus, in the use of existing standards, the energy occurs in bunches, centered at multiples of 15,750 c.p.s. with sidebands spaced at various multiples of the vertical scanning rate. Between these energy bunches are spaces or gaps which are relatively free of video energy.

According to the objects of the invention, apparatus is provided by which the sound components of a television signal are interleaved in the space between a selected pair of the energy bunches in the television picture or video signal. By the proper positioning of the sound components or signal in the frequency spectrum of the picture signal between the selected pair of energy bunches, in a manner to be described, the sound signal may be interleaved without excessive interference from the picture elements. Also interference from sound into video is minimized at the selected frequency.

An interleaved sound system is provided by the invention such that both picture and sound signals can be simultaneously transmitted over a signal video circuit. The videto circuit need not be high in quality. For example, a coaxial cable of about one-half the normal bandwidth may be used and should not impair the sound quality.

A more detailed description of the invention will now be given with reference to the accompanying drawing in which.

Figure 1:
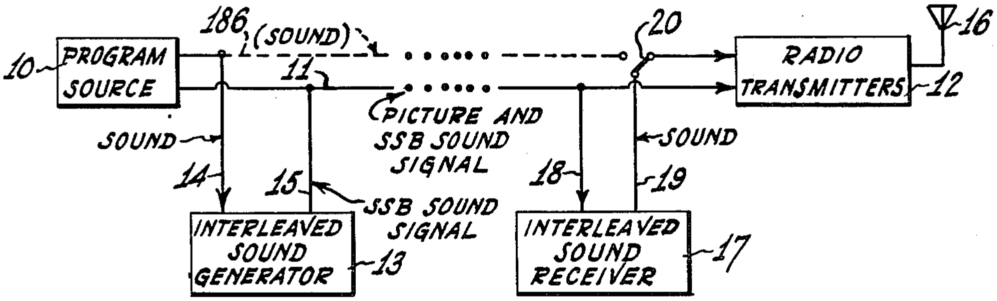
Figure 1 is a block diagram of one application of an interleaved sound system constructed according to the invention.

For the sake of description, it will be assumed that the invention is to be used in the connection between a program source such as a television studio and a radio transmitter or other means for transmitting the television signal originating at the studio to a desired distant location. This application of the invention is shown in the block diagram of Figure 1.

A program source 10 includes any suitable apparatus for producing the sound and picture components of a television signal. The picture component is transmitted over a connection represented by a lead 11 to radio transmitters 12. The lead 11 may be any means capable of carrying a picture or video signal and may be a coaxial cable of conventional construction and operation. As shown by the dotted section, the connection represented by lead 11 may include a radio transmission system such as a microwave relay system.

In accordance with the invention, the sound component or audio signal is applied from the program source 10 to an interleaved sound generator 13 over connections represented by lead 14. The generator 13 is arranged in one embodiment of the invention to process the applied sound signal into a single sideband signal of predetermined frequency. The single sideband signal is fed from the generator 13 to the lead or connection 11 over connections represented by lead 15 and is added to the video signal. The frequency of the single sideband signal produced by the generator 13 and applied to lead 11 is determined so that a composite signal or wave appears on lead 11 in which the single sideband sound signal is interleaved in the space between two adjacent, pre-selected energy bunches of the picture signal.

The composite signal is fed over the lead 11 to the radio transmitters 12. A picture transmitter 12 is responsive to the picture signal received over lead 11 to transmit the picture signal via an antenna 16 to a distant location. A portion of the composite signal fed over lead 11 is applied to an interleaved sound receiver 17 over connections represented by lead 18. The interleaved sound receiver 17 is responsive to the single sideband sound signal in the composite wave received to reproduce the sound or audio originating at the source 10. The sound signal is fed over connections represented by a lead 19 and including a switch 20 to a sound transmitter 12. The sound transmitter 12 functions to transmit the sound signal via the antenna 16 or other means to the distant location. While radio transmitters 12 are shown, any desired means for transmitting or utilizing the sound and picture signals may be used. Many examples of apparatus for transmitting the picture and sound signals over a radio path or land lines are available, and a detailed description thereof is not necessary.

As previously mentioned, it is known that the useful energy of television signals occupies the spectrum from 30 c.p.s. through about 4.2 mc. The video generated by scanning a picture is composed mainly of energy which is harmonically related to the horizontal and vertical scanning rates. Assuming a horizontal scanning rate of 15,750 c.p.s., the video occurs in energy bunches centered at multiples of 15,750 c.p.s., with sidebands at various multiples of the vertical scanning rate. Spaces which are relatively free of video energy occur between the energy bunches.

Figure 2:
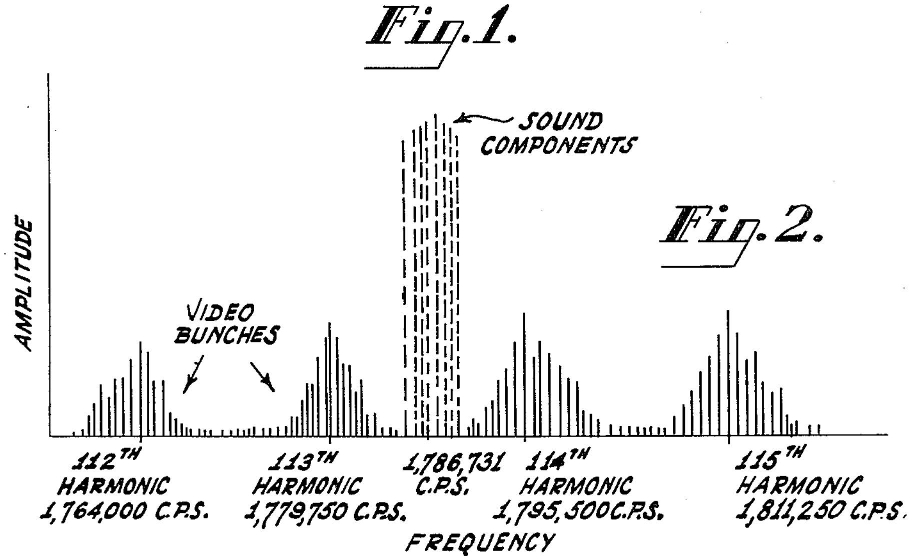
Figure 2 shows a portion of the frequency spectrum of a typical composite television signal or wave, including sound and picture signals, as produced by the invention.

There is shown in Figure 2 a portion of the frequency spectrum of a typical picture or video signal. While only the 112th, 113th, 114th and 115th harmonics are shown for present purposes, the remainder of the frequency spectrum of the picture signal can be readily visualized from the portion shown in Figure 2. As shown, between the video energy bunches centered at the respective harmonic frequencies there are gaps in which the video energy is at a minimum. There are hundreds of intervals between the bunches of video energy, and one or more of these gaps could be used for the tranmission of intelligence. However, tests have indicated certain locations in the video spectrum to be most favorable. The lower harmonics of 15,750 c.p.s. such as in the hundreds of kilocycles (kc.), are found to generally have greater amplitudes than the harmonics in the megacycles region. This indicates that somewhere close to the video ceiling would be the most favorable position for interleaving sound signals. However, there appear to be important reasons for avoiding an excessively high frequency placement. Interleaving the sound at too high a frequency might aggravate the apparatus stability problems. In addition, the sync generator shifts caused by power line control frequency fluctuations would be excessive. Also, low quality transmission, such as over some coaxial cables, might lose the sound components. Comparative tests conducted on the approximate frequencies of 515 kc., 1,420 kc. and 1,860 kc. indicated the best overall results in the range of the highest of the three frequencies.

Having determined the approximate position most favorable for interleaving sound in the picture signals, it remains to determine the optimum type of modulation for the interleaved sound. Frequency modulation would appear to be practicable except for the narrow gap between video bunches and the fact that frequency modulation would imply full transmission level regardless of audio program peaks or pauses. Ordinary amplitude modulation would appear to be undesirable for similar reasons. Amplitude modulation with suppressed carrier would represent an improvement since during audio program pauses there would be no interference into the video and also because the recovered sound signal-to-noise ratio would be better. However, the bandwidth would be double that of a single sideband system. From the above, it follows that a single sideband suppressed carrier system appears to have definite advantages. Such a system has the narrowest frequency band requirement, leaving the greatest tolerance for movement of the television sync generator frequency and consequent movement of the picture energy. Stabilized transmitting and receiving equipment can be developed which will be much simpler and more reliable than those requiring a lock to sync generator pulses. Carrier reinsertion is not phase sensitive as in the double sideband suppressed carrier system, and the best overall sound signal-to-noise is possible without picture degradation.

For purposes of description, it will be assumed, following a consideration of the above-mentioned factors, that it has been determined that optimum operation is obtainable in a given application by interleaving the sound signal at a frequency of approximately 1,785 kc. or in the area of the 113th–114th harmonic. Gaps in the video energy are centered at all odd multiples of half horizontal scanning frequency or $$\frac{15,750}{2}$$

time any odd integer. Knowing approximately the desired operating frequency of 1,785 kc., a suitable odd integer is 227. This multiplies out to 1,787,625 c.p.s. as the desired gap center (assuming a 60 c.p.s. controlled sync generator). Measurements of power line frequency have indicated a maximum variation of 0.1 percent. Furthermore, calculation of the departure of color sync generators from the exact 60 c.p.s. controlled generator shows that color runs 0.1 percent low. In one embodiment of the invention which has been tested, it was decided to locate the center of the sound band midway between the color and 60 c.p.s. controlled sync generators, even though on occasions black-and-white may run .05 percent or so above normal. Thus, 1 percent of 1,787,625 is divided by two, and the result 894 c.p.s. is subtracted. This gives the desired band center of 1,786,731 for the sound signal interleaved in the picture signal The present audio spectrum is from 120 through 4,200 c.p.s. and, on the average, maximum energy probably centers around 500 c.p.s. However, this energy center is not the sole factor in determining optimum interleaving frequency, since high audio frequencies are pre-emphasized and occasionally create the highest peak levels. Thus, 1000 c.p.s. is taken as the audio band center. Assuming that single sideband sound modulation is used and that the upper sideband is selected, the single sideband carrier prior to suppression should have a frequency 1,000 c.p.s. below 1,786,731 or 1,785,731 c.p.s.

In the embodiment of the invention depicted in Figures 1 and 2, therefore, the interleaved sound generator 13 is responsive to the sound or audio signal supplied by the program source 10 to produce at its output a single sideband signal having a band center at 1,786,731 c.p.s. The single sideband signal is combined with the picture signal supplied over lead 11 by the program source 10 to produce a composite signal as shown in Figure 2. The sound components are interleaved in the gap between the 113th and 114th harmonic video bunches. The interleaved sound receiver 17 functions to recover the single sideband sound signal from the composite signal and to apply the sound or audio signal as supplied originally by the program source 10 to the sound transmitter 12.

Figure 3:
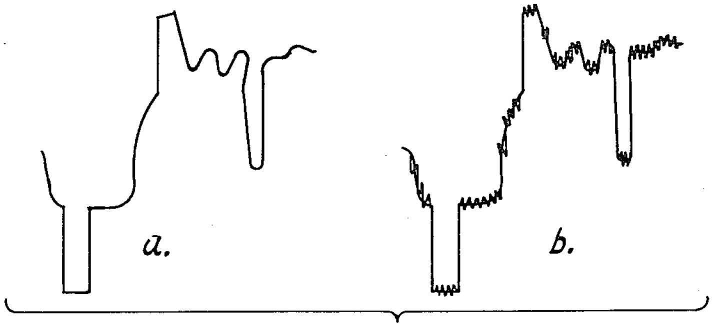
Figure 3 shows a pair of video waveforms useful in describing the operation of the invention.

As shown in Figure 2, the amplitude of the sound components is determined so as to be appreciably greater than that of adjacent video bunches to provide proper signal-to-noise ratio, although the diagram is not intended to be exactly to scale in this respect. However, when all the video bunches are combined, as for example in a peak-to-peak voltage measurement, the sound components represent only a small fraction. The complete video waveform, as observed on a cathode ray oscilloscope is shown in Figure 3. Figure 3*a* represents a portion of a single line scan under normal condition, while Figure 3*b* represents the same condition with the addition of interleaved sound according to the invention. As shown, the sound signal amplitude amounts to about 5 percent of the total amplitude. After transmission over a long line or a radio relay circuit, for example, the sound undulations during the sync pulse are generally eliminated.

In describing the invention, it has been assumed that the sound signal is to be interleaved as a single sideband signal. A circuit diagram of a single sideband signal generator suitable for use as the generator 13 of Figure 1 is given in Figure 4. Assuming that the upper sideband of a suppressed carrier single sideband signal is to be used, a local oscillator such as a crystal oscillator 25 having an operating frequency of 1,785,731 c.p.s. is provided. The output of the oscillator 25 is fed to the control grid of a low gain or isolating amplifier tube 26 over an electrical path including a capacitor 27, and resistors 28, 29 series connected to ground. The term ground as used in the specification is to be understood as referring to a point of fixed or zero alternating reference potential. The cathode of tube 26 is connected through a resistor 30 to the junction of resistors 28, 29 and the suppressor grid of tube 26 is connected to ground. The plate of tube 26 is connected to the positive terminal 31 of a source of unidirectional potential, for example, 150 volts, over an electrical path including the primary winding 32 of an input transformer 33 and a resistor 34. The screen grid of tube 26 is connected to the terminal 31 through the resistor 34 and a network including resistor 35 and by-pass capacitors 36, 37 connected to ground.

Tube 26 is biased in the manner described to be normally conducting, and the oscillations produced by the oscillator 25 are amplified and applied to the winding 32 of the transformer 33. The transformer 33 includes two secondary windings 38, 39. One end of the first winding 38 is connected to ground through capacitor 41, and the other end is connected to the grid of a triode tube 43. One end of the second winding 39 is connected to ground through a capacitor 44 and the other end of winding 39 is connected to the grid of a second triode tube 45. A resistive load including series-connected resistors 46, 47 is connected across the windings 38, 39 between the grids of tubes 43, 45. A grid return resistor 48 is connected between the junction of resistors 46, 47 and ground. A variable capacitor 49 having a fixed capacitor 50 connected thereacross is connected between the grids of tubes 43, 45 and functions to tune the input to the tubes 43, 45.

A sound signal originating, for example, at a program source 10 as shown in Figure 1 is applied over the connections represented by lead 14 to input terminals 51, 52. An input switch 53 having a pair of wiper arms arranged to be moved simultaneously between three contact positions is provided. One side of the input is applied from terminal 51 to the junction of winding 38 and capacitor 41 through one wiper arm and contact 2 of the switch 53 and a capacitor 54. The other side of the input is applied from the terminal 52 to the junction of the second winding 39 and capacitor 44 through the second wiper arm and contact 2 of switch 53 and a capacitor 55. The cathodes of tubes 43, 45 are connected together through a balancing resistor 56 having an adjustable tap connected to ground through a resistor 57. The plates of tubes 43, 45 are connected directly together and to the positive terminal 58 of a source of unidirectional potential, for example, 150 volts, through a resistor 59, a radio frequency by-pass capacitor 60 and a resistor 61.

From the above, it is apparent that tubes 43, 45 form a balanced modulator of conventional construction and operation. The sound signal supplied via terminals 51, 52 and the radio frequency signal supplied by oscillator 25 are each applied in an out of phase relationship (push-pull) to the grids of tubes 43, 45. The resistor 56 is adjusted to minimize the output carrier frequency energy such that only the sum and difference frequencies resulting from the operation of the modulator appear at the output thereof. The resulting output frequencies are applied from the plates of tubes 43, 45 to the control grid of an amplifier tube 62 over an electrical path including a coupling capacitor 63 and a grid resistor 64 connected to ground.

The cathode of tube 62 is connected to ground through a biasing resistor 65. The plate of tube 62 is connected to the positive terminal 70 of a source of unidirectional potential through a pair of resistors 71, 72. The screen grid of tube 62 is connected to the terminal 70 over an electrical path including a capacitor 73 connected to ground, a resistor 74, a capacitor 75 connected to ground and the resistor 72. Tube 62 is biased in the manner described to be normally conducting, and the resulting amplified signal is applied via a capacitor 76 from the plate of tube 62 to a crystal single sideband filter 77 connected to ground.

The filter 77 is constructed to have a relative response characteristic such that it passes only a selected one of the sidebands available at its input. It has been assumed that the upper sideband is to be selected. The filter 77 therefore is set to reject the carrier and lower sideband frequencies and to pass only the upper sideband. Crystal filters having such a response are commercially available and a detailed description of the construction and operation thereof is unnecessary. If the lower sideband were to be selected, a filter 77 having the proper response characteristic to pass only the lower sideband would be used.

The upper sideband is fed from the filter 77 to the control grid of an amplifier tube 79. The control grid of tube 79 is connected to ground through a resistor 80 and the armature 81 and contact 82 of a relay 83. For the moment, it will be assumed that the winding 84 of relay 83 is energized over an electrical path including a closed on-off switch 85 and a current source such as a battery 86, causing the armature 81 to engage contact 82 as shown in the drawing. The cathode of tube 79 is connected to ground through a resistor 87 and the armature 81 and contact 82 of relay 83, and the suppressor grid of tube 79 is connected to ground. The plate of tube 79 is connected to the positive terminal 88 of a source of unidirectional potential, for example, 150 volts, over an electrical path including a resistor 89, a capacitor 92 connected to ground and a parallel tuned circuit comprising a variable inductor 90 and a capacitor 91. The screen grid of tube 79 is connected to the terminal 88 over an electrical path including a capacitor 93 connected to ground, a resistor 94, the capacitor 92 and the resistor 89. The plate of tube 79 is tuned to the approximate center of the upper sideband signal by the inductor 90. The amplified upper sideband signal is fed from the plate of tube 79 to ground over a path including a capacitor 95, a resistor 96 and a resistor 97.

Resistor 96 includes a variable tap connected to the control grid of a final amplifier tube 98. The cathode of tube 98 is connected to ground through a resistor 99, and the suppressor grid of tube 98 is connected to ground. The plate of tube 98 is connected to the positive terminal 100 of a source of unidirectional potential, for example, 150 volts, through resistors 101, 102. The screen grid of tube 98 is connected to the terminal 100 over a path including a capacitor 103 connected to ground, a resistor 104, a capacitor 105 connected to ground and resistor 102.

The output of amplifier tube 98 (the amplified upper sideband sound signal) is applied from the plate of tube 98 to the picture line 11, shown as a coaxial cable, by the connections represented by lead 15 in Figure 1 and including a capacitor 106 and resistor 107. The high impedance in the form of resistor 107 serves to bridge the single sideband signal generator across the coaxial video cable 11.

Figure 4:
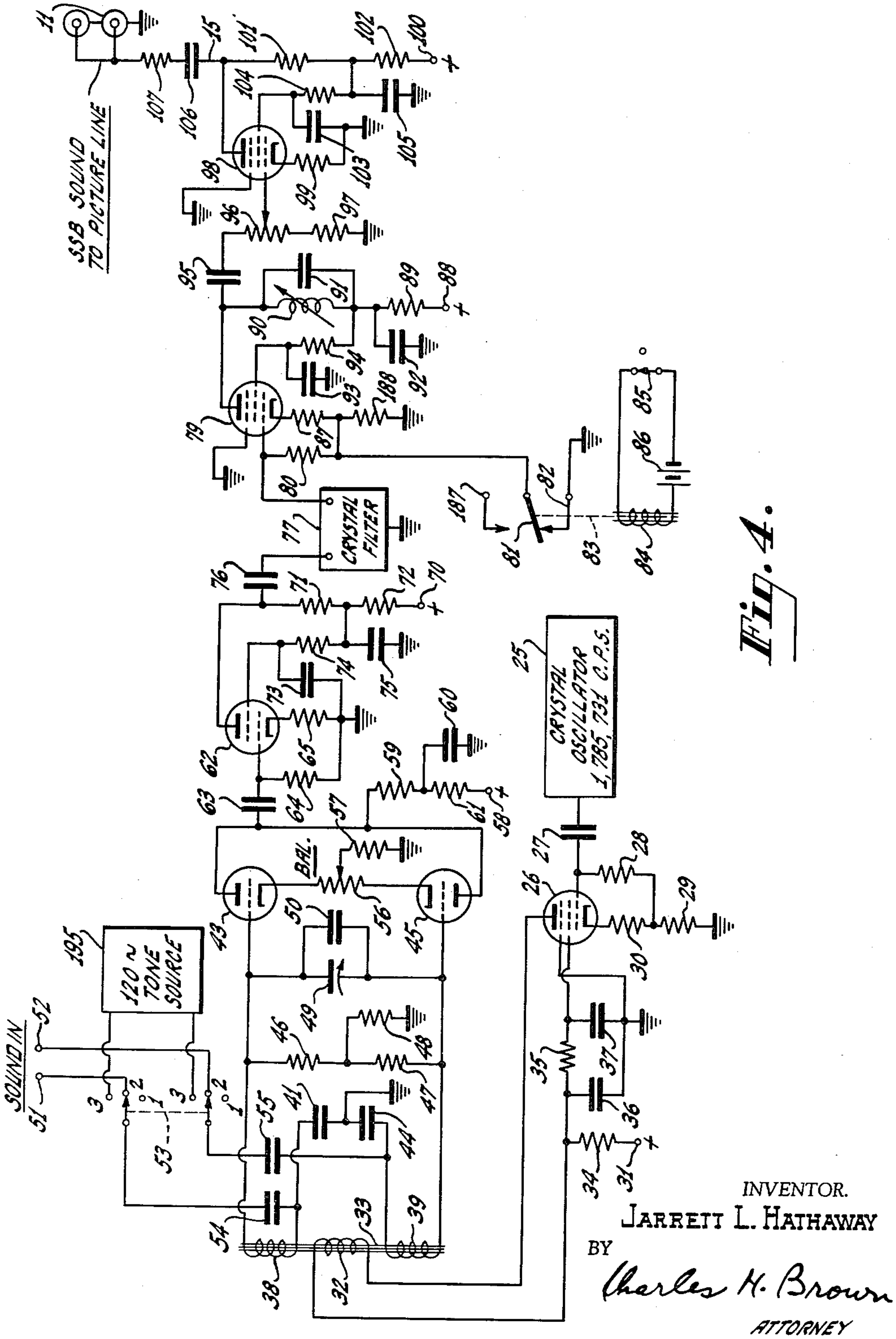
Figure 4 is a circuit diagram, given only by way of example, of an interleaved sound generator suitable for use in the block diagram of Figure 1.

In the operation of the circuit arrangement given in Figure 4, then, a composite signal as shown in Figure 2 is produced on the cable or lead 11. The single sideband sound signal is interleaved in the gap between the video bunches corresponding to the 113th and 114th harmonics. The output level of the generator is adjusted by the resistor 96 for the desired level of audio transmission on the video line. As mentioned in connection with Figure 3, it has been found satisfactory to set the level around 5 percent of the peak-to-peak composite video level. Under this condition, picture monitors and receivers show a pattern during modulation peaks which is somewhat less obvious than the cross-hatch pattern on a black-and-white monitor due to color transmission. During low level audio passages interference into the video is non-existent.

Figure 5:
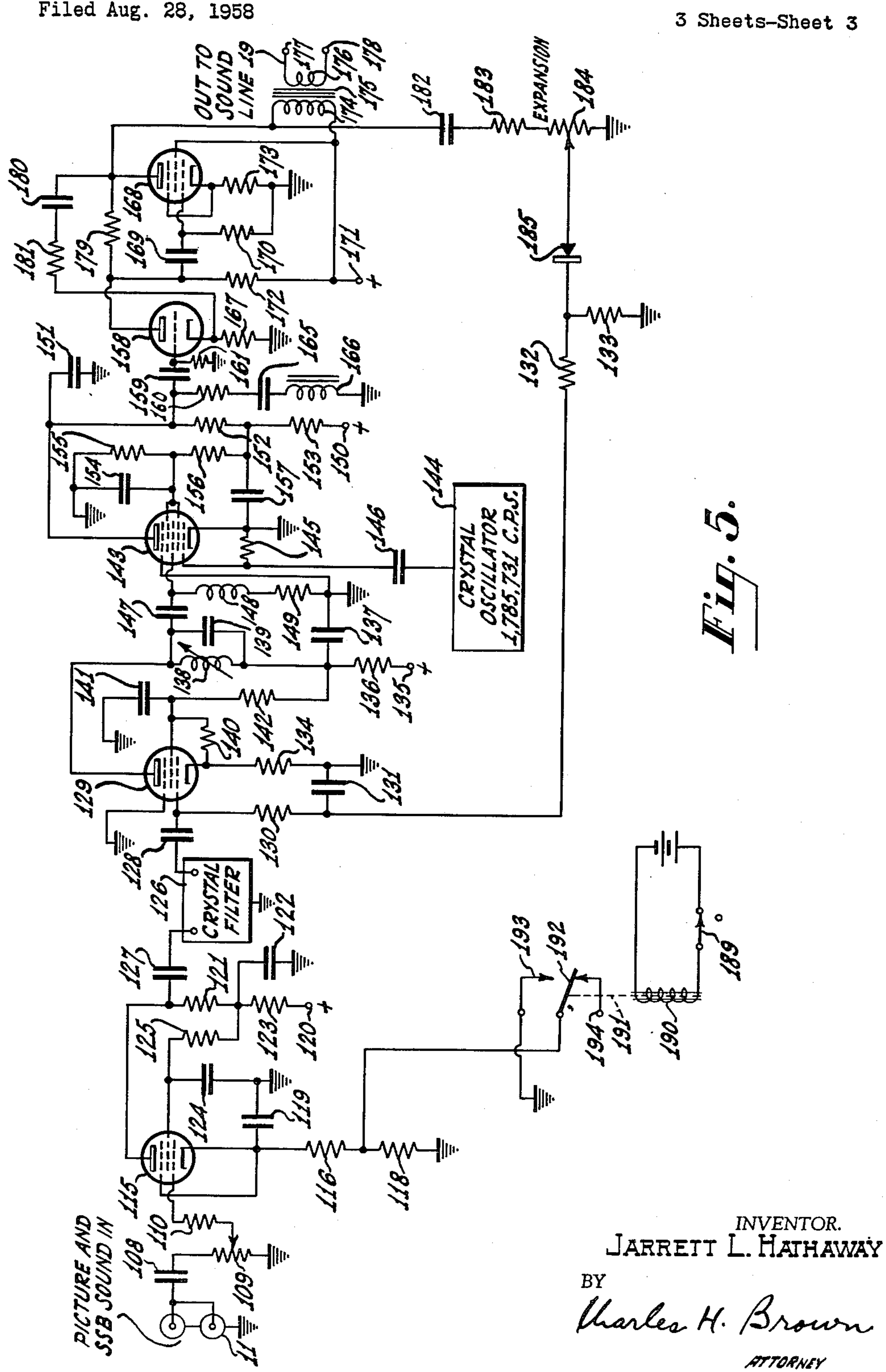
Figure 5 is a circuit diagram, given only by way of example, of an interleaved sound receiver suitable for use in the block diagram of Figure 1.

A circuit diagram of an interleaved sound receiver suitable for use as the receiver 17 in Figure 1 and in an application including the interleaved sound generator of Figure 4 is given in Figure 5. The receiver is bridged across the cable or lead 11 by the connections shown as lead 18 in Figure 1 including a capacitor 108 and resistor 109 connected in series between the cable 11 and ground. Resistor 109 includes a variable tap connected through a resistor 110 to the control grid of an amplifier tube 115. The suppressor grid of tube 115 is connected to the cathode thereof and the cathode is connected to ground over an electrical path including a capacitor 119 connected to ground and resistors 116, 118. The plate of tube 115 is connected to the positive terminal 120 of a source of unidirectional potential, for example, 150 volts, over an electrical path including a resistor 121, a capacitor 122 connected to ground and a resistor 123. The screen grid of tube 115 is connected to the terminal 120 over an electrical path including a capacitor 124 connected to ground, a resistor 125 and resistor 123.

Resistor 109 operates as the input level control and is set to provide the proper operating level for the amplifier 115. The amplified picture and single sideband sound signal are applied from the plate of tube 115 through a capacitor 127 to a crystal filter 126 connected to ground. The filter 126 is of the same construction and characteristics as the filter 77 in the generator of Figure 4 and is designed to pass the upper sideband. Thus, the sound signal interleaved on the picture line 11 is passed through the filter 126 and a capacitor 128 to the control grid of an amplifier tube 129.

The control grid of tube 129 is connected to ground over an electrical path including a resistor 130, a capacitor 131 connected to ground and resistors 132, 133. The cathode of tube 129 is connected to ground through a resistor 134, and the suppressor grid of tube 129 is connected to ground. The plate of tube 129 is connected to the positive terminal 135 of a source of unidirectional potential over an electrical path including a resistor 136, a capacitor 137 connected to ground and a parallel tuned circuit comprising a variable inductor 138 and a capacitor 139. The screen grid is connected to the cathode of tube 129 through a resistor 140 and to the terminal 135 over an electrical path including a capacitor 141 connected to ground, a resistor 142 and the resistor 136. The plate of the amplifier tube 129 is tuned to the center of the upper sideband by the inductor 138.

The tuned output of the amplifier 129 is fed to a demodulator stage including a multi-grid tube 143. For convenience, the grids of tube 143 will be referred to as first through fifth, reading from the cathode to the plate of tube 143. The cathode of tube 143 is connected to ground. The first grid is coupled to the output of a local oscillator 144 over an electrical path including a resistor 145 connected to ground and a capacitor 146. The oscillator 144 may be a crystal oscillator of the same construction and operation as the local oscillator 25 of the generator in Figure 4 and is set to generate oscillations of the same carrier or radio frequency, 1,785,731 c.p.s. The third grid of tube 143 is coupled to the tuned plate of tube 129 by a capacitor 147 and a series circuit connected to ground including an inductor 148 and a resistor 149. The fifth grid of tube 143 is connected to ground. The plate of tube 143 is connected to the positive terminal 150 of a source of unidirectional potential, for example, 150 volts, over an electrical path including a capacitor 151 connected to ground and resistors 152, 153. The second and fourth grids of tube 143 are connected together and to the terminal 150 over an electrical path including a capacitor 154 and resistor 155 parallel-connected to ground, a resistor 156, a capacitor 157 connected to ground and the resistor 153.

Capacitor 151 functions to remove the radio frequency or local oscillator frequency and is large enough to also remove some of the higher audio frequencies. The capacitor 151 serves to limit the upper audio frequency response so as to avoid interference in the sound from the edges of the video bunches adjacent to the interleaved sound components in the composite signal carried over lead 11.

The audio frequency signal resulting from the beating of the local oscillator frequency with the received single sideband sound signal is coupled from the plate of demodulator tube 143 to the grid of an amplifier tube 158 over an electrical path including a capacitor 159, resistor 161 connected to ground and a series tuned circuit connected to ground including a resistor 160, a capacitor 165 and an inductor 166. The series tuned circuit just described serves to reduce the response where there would otherwise be excessive energy, caused by imperfection in the band pass of either or both of the crystal filters 77, 126.

The cathode of the audio amplifier tube 158 is connected to ground through a resistor 167. The plate of tube 158 is coupled to the control grid of a second or final audio amplifier tube 168 via a capacitor 169 and a resistor 170 connected to ground. The plate of tube 158 is connected to the positive terminal 171 of a source of unidirectional potential, for example, 150 volts, through a resistor 172. The amplified audio signal is applied from the first audio amplifier 158 to the second amplifier 168 for further amplification. The second audio amplifier tube 168 includes a cathode connected to ground through a resistor 173 and a suppressor grid connected to the cathode thereof. The plate of tube 168 is connected through the primary winding 174 of an output transformer 175 to the terminal 171, and the screen grid of tube 168 is connected directly to the terminal 171. The amplified audio frequency or sound signal originating at the program source 10 of Figure 1 appears across the secondary winding 176 of transformer 175 for application to the sound transmitter 12 or other apparatus via output terminals 177, 178 and the connections represented by lead 19 in Figure 1.

In order to reduce harmonic distortion and output impedance, a first and second feedback path are provided between the audio amplifier tubes 158, 168 shown in Figure 5. A first feedback path is completed from the plate of tube 168 to the output of tube 158 through a resistor 179 so as to reduce the gain of the second amplifier tube 168. A second feedback path is completed from the plate of tube 168 to the cathode of tube 158 through a capacitor 180 and a resistor 181 to reduce the gain of the entire audio amplifier.

For an optimum signal-to-noise condition, the audio or sound input to the interleaved sound generator from the program source 10 is by means of an automatic audio gain control (compressor). To partially offset the effect of the compression circuit at the generator input, while at the same time increasing the signal to noise ratio, an expansion circuit is provided at the receiver. A portion of the amplified audio or sound signal at the plate of tube 168 is applied to ground over an electrical path including a capacitor 182, a resistor 183 and a resistor 184. A variable tap on resistor 184 is connected through a diode or other unidirectional current conducting device 185 to the junction of resistors 132, 133. The diode 185 is poled to conduct in the direction of the arrow. Resistors 132 and 133 are included in the biasing circuit of the amplifier tube 129 as previously described. During high level program periods, the positive voltage fed back causes the gain of the tube 129 to increase. During quiet periods, the reduced gain of the tube 129, improves the apparent signal-to-noise ratio. It has been found satisfactory to set the tap on resistor 184 so as to operate the expansion circuit at or about 6 db (decibels).

In describing the invention, it has been assumed that the picture and sound signals originating at a program source are, by means of the invention, to be regularly forwarded over a single video circuit. The invention is also suitable for use in an application where the interleaved sound system of the invention is used on a standby or emergency basis. It is common practice in the operation of television transmission systems between a program source and equipment such as the radio transmitters 12 to forward the sound signals over one path including, for example, a high velocity coaxial cable and the picture signals over a second separate path including, for example, a microwave relay system. Such a system is shown in Figure 1. The picture signals are forwarded over the lead 11 which, as indicated by the dotted section, may include a microwave relay or other radio system. The sound signals are forwarded over a second path represented by the dashed lead 186. The path 186 may include a coaxial cable or, as indicated by the dotted section, may also include a microwave relay or other radio system. The switch 20 is ordinarily positioned so as to complete the path 186 for the sound signals between the source 10 and the sound transmitter 12.

The loss of the sound signals due to a mechanical or other failure in the path 186 results in considerable expense and grief to those concerned with the operation of the overall system. The invention provides an inexpensive and highly practical way of saving the program transmission during sound transmission failures where two separate paths are normally used to carry the program intelligence. According to the invention, an interleaved sound generator 13 constructed, for example, as shown in Figure 4, is connected between the lead 11 and the output of source 10. The generator 13 is responsive to the sound signals originating at the source 10 to produce a composite signal over lead 11 in the manner described. The interleaved sound receiver 17 constructed, for example, as shown in Figure 5, is connected between the lead 11 and the switch 20.

Reference has been made to the relay 83 in the generator of Figure 4. During periods of proper sound transmission over lead 186, the generator is held on standby operation. Switch 85 is open, causing winding 84 of relay 83 to be deenergized. Armature 81 engages an open contact 187 of relay 83. As a result of this action, the cathode and control grid of amplifier tube 79 are connected to ground through a second resistor 188. The added resistance of resistor 188 reduces the gain of the amplifier tube 79, and thereby reduces the level of the sound signal interleaved on the line 11 to a point where no interference occurs in the picture signals forwarded over lead 11. A similar relay arrangement is provided at the receiver shown in Figure 5. In standby operation, a switch 189 is open, causing the winding 190 of a relay 191 to be deenergized. In this condition of relay 191, the cathode of amplifier tube 115 is connected to ground through the resistor 116, armature 192 and contact 193 of relay 191. Resistor 118 in the cathode circuit is shorted out, increasing the gain of amplifier tube 115 and of the receiver.

When a failure occurs in the sound path or connection 186, the switch 20 is placed in the position shown in Figure 1 to connect the sound input of transmitters 12 to the output of the interleaved sound receiver. Switch 85 at the generator, Figure 4, is closed. Relay 83 is operated, causing armature 81 to engage contact 82. This action shorts out the resistor 188 in the cathode and control grid circuit of amplifier tube 79, increasing the gain of tube 79. The output sound signal interleaved on lead 11 increases, for example, by 15 db, to full level transmission. At the receiver, Figure 5, the switch 189 is closed, operating relay 191. Armature 192 is made to engage an open contact 194 of relay 191. The cathode of tube 115 is then connected to ground through the resistors 116, 118. The gain of tube 115 is reduced, and so on. While switches 85 and 189 are shown as manually operated, a suitable alarm and automatic switching circuit including means for transmitting a control tone or other signal over an auxiliary tie line circuit may be completed therebetween so that the two switches are automatically switched almost simultaneously in response to a failure on the path 186, causing only a minimum of transmission time of the sound signals to be lost. When amplifier 79 operates at high gain and the amplifier 115 at low gain during full level sound transmission, the signal-to-noise ratio is improved by approximately 15 db as compared to the standby condition.

While the arrangement of Figure 1 assumes two separate inputs, picture and sound, and two separate transmitters 12, the invention may also be used in arrangements where a single transmitter is designed to transmit or otherwise handle the composite sound and picture signal. In such a system the composite signal is received by suitable radio receiver or other apparatus at a desired distant location and fed to the interleaved sound receiver as described. The sound or audio signal is reproduced by the interleaved sound receiver and fed to a loud speaker or other sound reproducing device, while the picture signal is fed from the radio receiver to suitable cathode ray tube or other picture reproducing means.

In the operation of the interleaved sound system of the invention, frequent checking of the oscillator frequencies is desirable to prevent audible distortion. The wiper arms of the input switch 53 in the generator, Figure 4, may be positioned at the respective contacts 3 of the switch 53 to connect the output of a 120 cycle tone source 195 to the input of the balanced modulator including tubes 43, 45. The output frequency of the generator can be measured with an accurate frequency counter. The frequency counter can, if necessary, be located at the receiver location, Figure 5. Alternatively, an oscilloscope may be employed to display the audio output from the receiver and to check the accuracy of the 120 cycle tone by Lissajous figures, assuming the oscilloscope is swept accurately at a 60 cycle rate. When no output is desired from the generator, the wiper arms of the switch 53 are caused to engage the open contacts 1 thereof, removing all signal input to the generator.

A simple and inexpensive arrangement is provided by the invention for simultaneously transmitting the sound and picture components of a television signal over a single video circuit.

What is claimed is:

1. A television system comprising, a source of television signals including sound signals and picture signals composed of energy harmonically related to the scanning rates employed at said source to produce said picture signals, said energy occurring in bunches centered at multiples of said scanning rates in the frequency spectrum of said picture signals, a transmission path connected to said source and adapted to carry said picture signals to a distant location, a sound generator connected between said source and said path and responsive to said sound signals to interleave said sound signals on said path between pre-selected ones of said bunches, whereby a composite signal including said picture and sound signals is carried over said path, means coupled to said generator for operating said generator to reduce the level of said interleaved sound signals to effectively remove said sound signals from said path, said generator operating in the absence of the operation of said means to interleave said sound signals at a given level to forward said interleaved sound signals over said path, a receiver connected to said path at said distant location and responsive to said composite signal to produce said sound signals as originally produced by said source when said sound signals are interleaved at said given level on said path, means coupled to said receiver for increasing the gain of said receiver during periods in which said generator is operated by said first-mentioned means to reduce the level of said interleaved sound signals, and signal processing means located at said distant location connected to said path and to said receiver responsive to said picture signals and to the sound signals produced by said receiver.

2. A television system as claimed in claim 1 and wherein said sound generator is responsive to said sound signals to produce a single sideband sound signal having a band center frequency located in the space between preselected adjacent bunches in said spectrum.

3. A television system as claimed in claim 1, and including a second transmission path connected to said source and adapted to carry said sound signals to said distant location, switching means located at said distant location arranged in one condition to connect said signal processing means to said second path and in a second condition to connect said signal processing means to said receiver, whereby the sound signals produced by said source can be carried from said source to said signal processing means over either said first or second path.

4. A television system as claimed in claim 1, and wherein said sound generator produces said sound signals at said given level with an amplitude appreciably greater than that of said pre-selected ones of said bunches to provide a satisfactory signal-to-noise ratio.

5. A television system as claimed in claim 1, and wherein said sound generator produces said sound signals at said given level with an amplitude approximately five percent of said composite signal amplitude.

References Cited in the file of this patent

UNITED STATES PATENTS

| | | |
|---|---|---|
| 1,769,918 | Gray | July 8, 1930 |
| 1,769,919 | Gray | July 8, 1930 |
| 1,769,920 | Gray | July 8, 1930 |
| 2,635,140 | Dome | Apr. 14, 1953 |
| 2,653,184 | Robinson | Sept. 22, 1953 |